United States Patent [19]
Lowe

[11] 4,202,857
[45] May 13, 1980

[54] CASTING OF ARTICLES FROM COMPOSITIONS CONTAINING CALCINED GYPSUM AND PORTLAND CEMENT

[75] Inventor: James N. Lowe, Reigate, England
[73] Assignee: Pitun-Unicrete Limited, Reigate, England
[21] Appl. No.: 925,670
[22] Filed: Jul. 18, 1978
[30] Foreign Application Priority Data
Jul. 19, 1977 [GB] United Kingdom ............... 30276/77
[51] Int. Cl.$^2$ ............................................. B28B 1/14
[52] U.S. Cl. ..................... 264/333; 106/89; 106/90; 106/111; 264/86; 264/DIG. 43
[58] Field of Search ............... 106/89, 90, 111; 264/333, 86, DIG. 43

[56] References Cited
U.S. PATENT DOCUMENTS

| | | | |
|---|---|---|---|
| 3,582,376 | 6/1972 | Ames | 106/90 |
| 3,666,703 | 5/1972 | Murata | 106/90 |
| 3,852,081 | 12/1974 | Lehman | 106/111 |
| 4,021,257 | 5/1977 | Bernett | 106/90 |
| 4,032,353 | 6/1977 | Ball et al. | 106/90 |
| 4,067,939 | 1/1978 | Lowe et al. | 264/333 |

Primary Examiner—Donald J. Arnold
Attorney, Agent, or Firm—Sughrue, Rothwell, Mion, Zinn and Macpeak

[57] ABSTRACT

An article is cast from a composition comprising a binding agent containing, by weight, from 90% to 10% calcined gypsum and from 10% to 90% Portland cement mixed with water to produce a fluid mixture which is caused to flow into a mould or other supporting device and is there allowed to set. To increase the durability of the cast article in the presence of moisture, sodium carbonate in an amount up to 5% by weight of the dry weight of the cement is added to the composition. The sodium carbonate is preferably present in an amount between 0.1% and 0.5% of the dry weight of the cement and the composition preferably also contains an acrylic resin emulsion in an amount from 0.25% to 4% of the dry weight of the gypsum and cement in the composition and a pigment such as iron oxide, titanium oxide or cobalt oxide in an amount from 0.25% to 4% by weight of the dry weight of the gypsum and cement in the composition.

12 Claims, 6 Drawing Figures

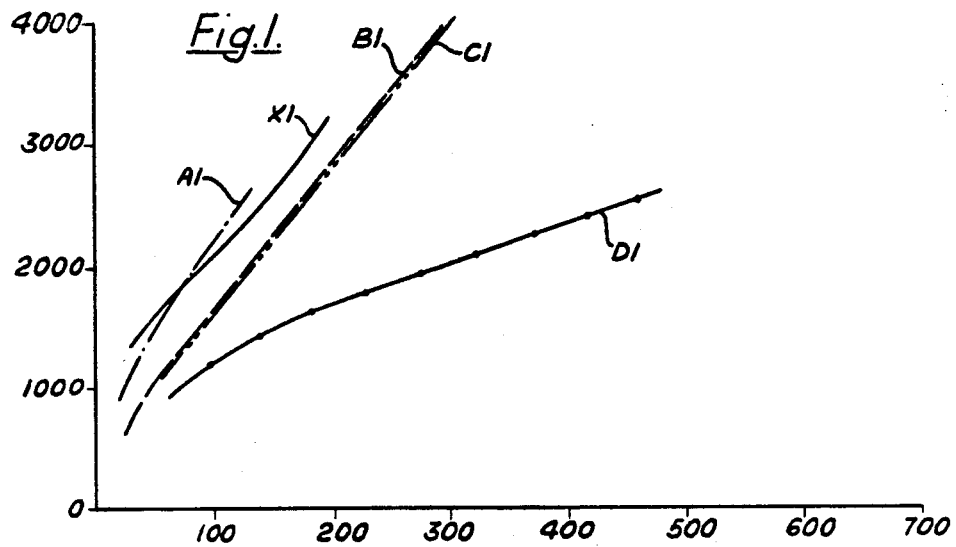
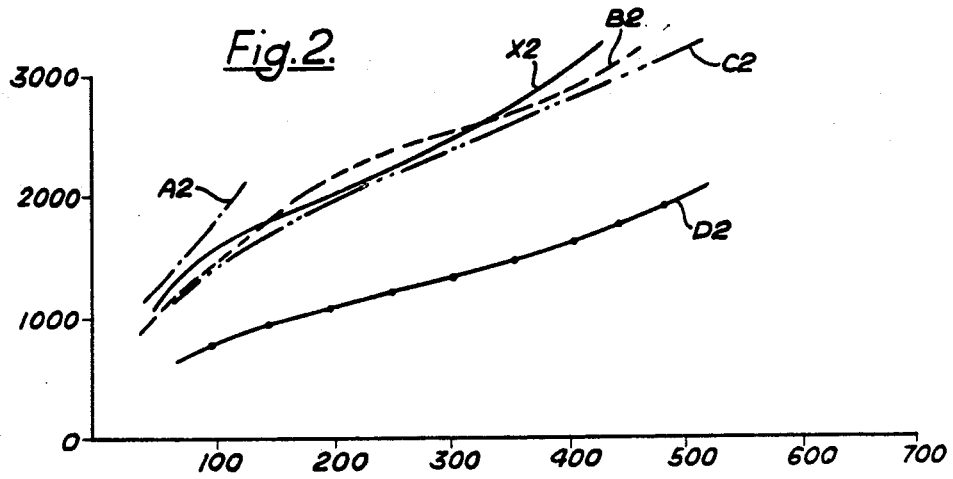

CASTING OF ARTICLES FROM COMPOSITIONS CONTAINING CALCINED GYPSUM AND PORTLAND CEMENT

This invention relates to methods of casting articles comprising the steps of mixing a composition comprising a binding agent containing, by weight, from 90% to 10% calcined gypsum and from 10% to 90% Portland cement with water to produce a fluid mixture, causing the fluid mixture to flow into a mould, form, or other supporting device and allowing the mixture to set in the supporting device. An example of such a method is described in my co-pending U.S. application Ser. No. 591,004 filed on June 27, 1975 jointly with Byron C. Grebe now U.S. Pat. No. 4,067,939.

A difficulty which occurs with articles cast from such a mixture is that if all or any part of the article is subsequently subjected to water in any form or extent, a reaction tends to take place between the gypsum and some components of the cement and also between some combinations of components of both the gypsum and the cement with the water. This tends to cause expansion locally or generally within the article with a consequent loss in compressive strength and a loss of other desirable properties. In building components and other articles where strength and dimensions must be substantially maintained during a long period of use, this difficulty must be overcome.

The magnitude of the expansion which takes place depends upon many factors, including the degree of wetness of the article and the period for which it remains wet.

As discussed to some extent in my prior Specification mentioned above, the durability of a cast article subjected to damp conditions can be greatly improved by various expedients which have the effect, inter alia, of reducing the rate of or limiting the expansion referred to above.

In particular, the use of cements with reduced contents of ingredients which are potentially reactive to produce expansion, commonly known as sulphate-resisting cements, and proper curing of the cast composition after it has set are beneficial. These expedients help to bring any reaction which may take place between the gypsum, water and components of the cement to completion as quickly as possible and it has been found that completion of the reaction in this way very greatly reduces the detrimental effects of the reaction.

I have now discovered that an addition of sodium carbonate to the composition at the time of mixing produces a marked improvement of the expansive characteristics of the composition if it is subsequently wetted, and thus also upon its durability. Thus according to the present invention, in the method of casting an article described above, the composition also contains sodium carbonate in an amount up to 5% by weight of the dry weight of the cement in the composition.

Preferably the cement is sulphate-resisting and preferably also the composition is cast and cured using the technique described in my prior Specification. Preferably also, the composition is treated as described in my prior Specification, that is to say either the water, or the components of the composition, or both are heated before mixing together so that the mixture has an initial temperature of from 70° to 130° F., the heat of the reaction of the calcined gypsum and the water as the mixture sets causes the temperature of the mixture to begin to rise, the mixture is removed from the supporting device after the mixture has set sufficiently to be self-supporting, the dissipation of heat from the set mixture is controlled after removal of the set mixture from the supporting device so that the temperature of the set mixture rises to a temperature which, depending upon the initial temperature, is from 90° to 180° F., the temperature is maintained in this range for a period of at least two hours after removal of the mixture from the supporting device, and during this period, an atmosphere of 100% relative humidity is maintained around the set mixture.

The subject matter of my prior Specification is incorporated herein by reference.

The sodium carbonate content of the composition may be between 0.1% and 1.0%, and preferably between 0.1% and 0.5%, of the dry weight of cement.

It has further been discovered that the durability of the cast composition can be still further increased by the addition to the composition of an acrylic resin emulsion. This may be added in an amount from 0.25% to 4%, preferably from 0.5% to 1.5% by weight of the dry weight of the gypsum and cement in the composition.

An addition of pigment in the form of iron oxide, titanium oxide, or cobalt oxide will also help to reduce expansion of the composition under wet conditions and improve its durability. The range of pigment contents is the same as the range for the acrylic resin emulsion.

It is not known why the addition of the sodium carbonate, with or without acrylic resin and/or pigment and with or without the initial heating and curing in accordance with my above-mentioned prior Specification, improves the durability of the cast composition when water is present. It appears from photographs of 10,000 magnifications that using the additional materials the internal structure of the cast composition is novel and some formations, such as crystals, which might have been expected from a knowledge of concrete are not present or have been modified notably. This may well mean that there is a different behaviour in the presence of water from what might have been expected. The addition of the sodium carbonate certainly produces a delay and a limitation in expansive behaviour and that delay or limitation can, apparently, for all practical purposes, be made indefinite and acceptable.

After the composition has been mixed with water, the reaction between the water and the gypsum produces heat and so also does the reaction between the cement and the water. Provided that the temperature reached within the composition after casting is not so high that it harms the gypsum, it is preferred to raise the temperature as high as possible and again this is where the curing regime with restriction of heat loss from the cast composition is of importance.

To illustrate the effect of the addition of sodium carbonate and other added materials to the composition under different curing conditions, a number of sample prisms were cast from a basic mix and from this basic mix with one or more of various added materials.

The basic mix was:

|  | Units of Weight |
| --- | --- |
| Sulphate-Resisting Portland cement | 50 |
| Alpha Gypsum | 50 |
| Sisal | 0.5 |
| Melment (a fluidizer) | 0.43 |

-continued

|  | Units of Weight |
|---|---|
| Retarder (sodium citrate) | 0.036 |
| Water | 36.5 |
| The added materials were: |  |
| Sodium Carbonate | 0.2 |
| Pigment (iron oxide) | 1.0 |
| Acrylic resin emulsion | 1.0 |

Some of the samples were cast from the basic mix alone; others were cast from the basic mix with sodium carbonate; still others were cast from the basic mix together with sodium carbonate and pigment and finally some were cast from the basic mix with sodium carbonate, pigment and acrylic resin emulsion. In each batch of samples, some were cured at about 20° C. (70° F.) for 24 hours and some at about 60° C. (140° F.) for either 5 hours or 20 hours. In the first case, the mixing water temperature was 20° C. (70° F.) and in the latter two cases at a temperature of 35° C. (100° F.). During the curing the moisture content of the set composition was substantially prevented from falling. Thus the general technique of curing in the latter two cases was in accordance with my above-mentioned prior Specification.

After curing, some samples were at once immersed in water at ambient temperature and so maintained thereafter and others were dried at 40° C. for two weeks and then immersed in water at ambient temperature thereafter.

The expansions of the various samples were then measured after various periods of time. The samples which were never dried expanded and the samples which were dried for two weeks shrank on drying, regained the shrinkage on wetting and then also expanded.

The results of tests showing the effect of using sodium carbonate alone or with pigment or with pigment and acrylic emulsion for a variety of curing and of curing-and-drying cycles are shown in the accompanying drawings which are graphs of expansion measured in micro-strains plotted as the abscissa against time in days plotted as the ordinate.

In the accompanying drawings,

FIGS. 1, 2 and 3 show the results of the tests carried out on prisms which were cured by keeping them wet at different temperatures and for different periods and were then immersed in water immediately after curing and without any intermediate drying.

Figure 3:
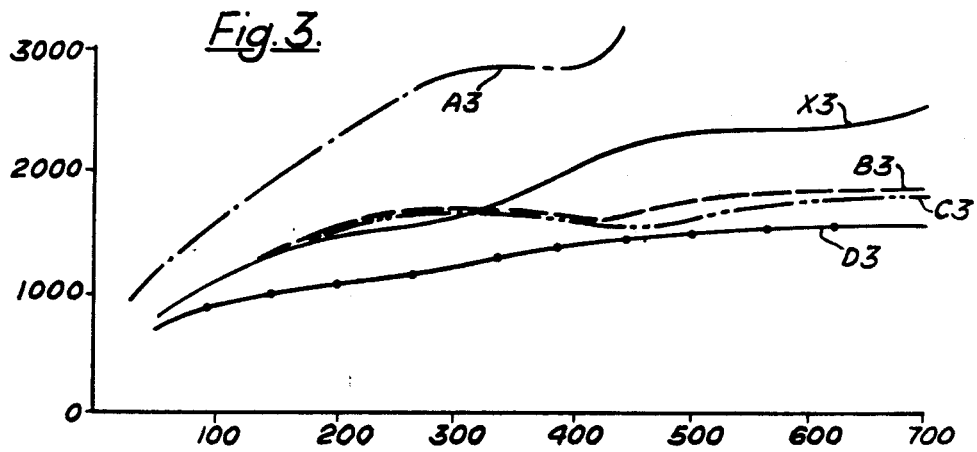
Figure 4:
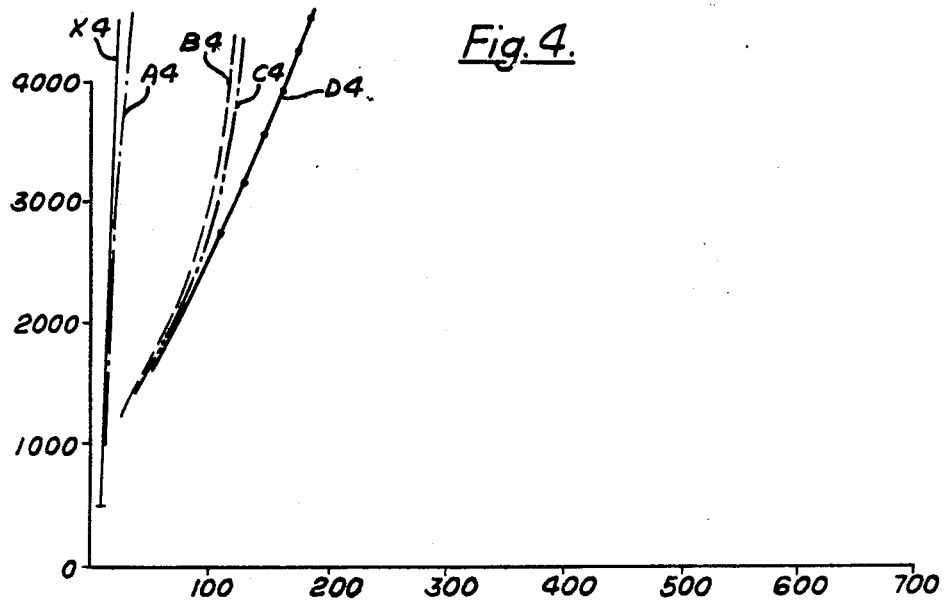
FIGS. 4 to 6 show the results of the tests on prisms which were cured at similar temperatures and for similar periods to those shown in FIGS. 1 to 3 respectively, but which, after curing were fully dried at a temperature of 40° C. for two weeks before they were immersed in water.
Figure 5:
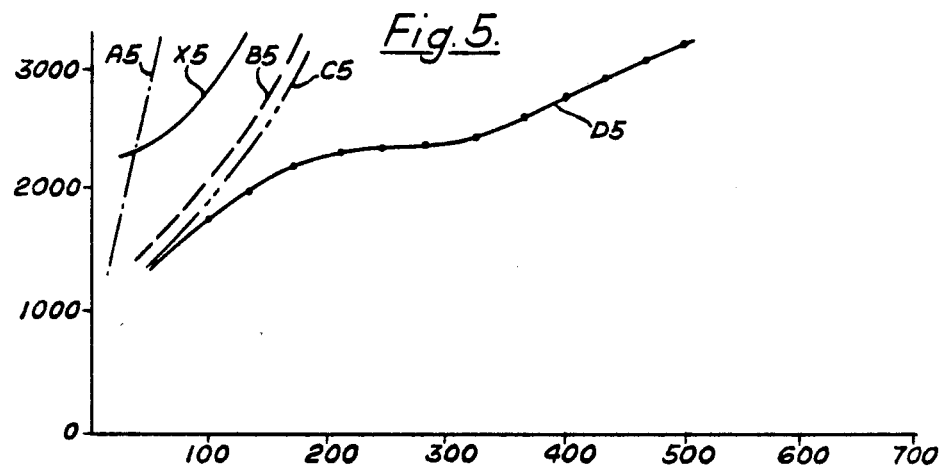
Figure 6:
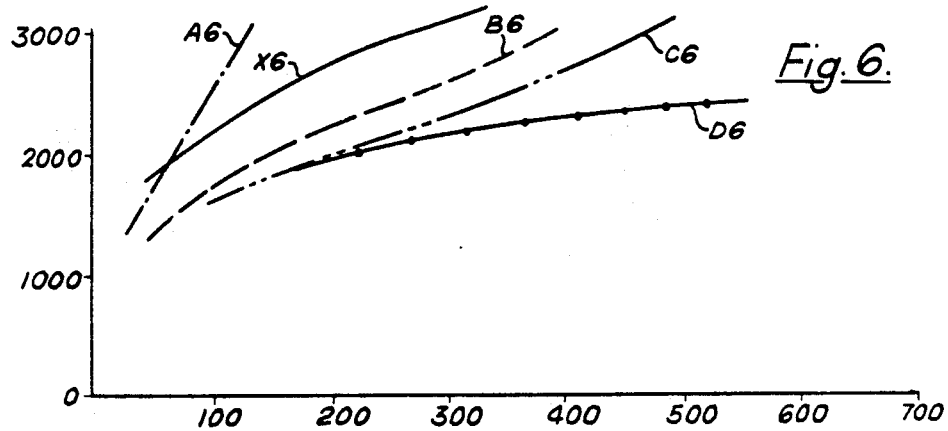

The expansions plotted in FIGS. 1 to 3 are measured from the initial lengths of the prisms after curing which, as stated, were wet. The expansions plotted in FIGS. 4 to 6 are the gross expansions measured from the lengths of the prisms after drying. In practice, drying brings about an initial shrinkage of about 1,000 microstrains and this may be subtracted from the expansions shown in FIGS. 4 to 6 to give the nett expansions.

Curve A1 in FIG. 1 represents the results from prisms made from the basic mix with cement having a fineness of 350 m²/kg with no added materials and curing at a temperature of 20° C. for 24 hours. Curve B1 represents the test results on prisms similar to those in curve A1, but in which the composition contained sodium carbonate in an amount of 0.2 units of weight, that is in an amount of 0.4% by weight of the cement content. Curve C1 represents the test results on prisms again similar to those in curve A1, but containing sodium carbonate in an amount of 0.4% by weight of the cement and iron oxide in an amount of 2.0% by weight of the cement. Curve D1 represents the test results on prisms which were cured at a temperature of 10° C. for 24 hours and in which the cement had a fineness of 390 m²/kg. The composition contained sodium carbonate in an amount of 0.4% by weight of the cement; iron oxide in an amount of 2.0% by weight of the cement and acrylic resin emulsion in an amount of 2.0% by weight of the cement.

In FIG. 2 curves A2 to D2 represent the results of tests carried out on prisms made from the same compositions as those represented by curves A1 to D1 respectively, but in each case curing took place for five hours in the prisms represented by curve A2 at a temperature of 70° C.; in the prisms represented by curves B2 and C2 at a temperature of 60° C. and in the prisms represented by curve D2 at a temperature of 65° C.

The test results represented by curves A3 to D3 in FIG. 3 are of prisms which correspond in all respects to those represented by curves A2 to D2 respectively except that curing took place for 20 hours.

Curves A4 to D4, A5 to D5 and A6 to D6 in FIGS. 4, 5 and 6 respectively correspond to curves A1 to D1, A2 to D2 and A3 to D3 respectively in every way except that, as already mentioned, the prisms were dried for two weeks at 40° C. before they were immersed in water and their expansion was measured over the periods of time noted.

Curves X1 to X6 in FIGS. 1 to 6 respectively are shown for comparison purposes only. They represent the expansion of prisms made from the basic mix with an addition of iron oxide in an amount of 2.0% by weight of the cement and acrylic resin emulsion in an amount of 2.0% by weight of the cement with no sodium carbonate. The prisms were cured, or dried and cured, in the same way as the other prisms represented by the other curves in the respective Figures.

The curves X1 to X6 indicate that the addition of sodium carbonate and acrylic resin emulsion produces a synergistic effect in that the reduction in expansion produced by the addition of sodium carbonate, iron oxide and acrylic resin is greater than the sum of the reductions produced by the addition of sodium carbonate alone and by the addition of acrylic resin emulsion together with iron oxide by themselves.

The additions of iron oxide and acrylic resin were beneficial in reducing expansion, but never so beneficial as the addition of sodium carbonate alone. Further, the benefit of sodium carbonate was always enhanced by the further inclusion of acrylic resin emulsion and iron oxide. This is shown to be so by the tests set out and a large number of other tests carried out in the course of development of the invention for the prisms whether dried or not, after curing and for the various curing regimes. The other pigments, namely titanium oxide and cobalt oxide, have been found to have just the same effect as iron oxide.

It will be seen that in every case the addition of sodium carbonate to the composition produces a substantial decrease in the expansion of the prisms at any given time. The decrease in expansion and hence the increase in the durability of the cast composition is further improved to a considerable extent by the addition to the composition of the acrylic resin emulsion and in all cases a raised curing temperature increases the improvement achieved by all of the added materials, the improvement being greater the greater the curing time.

The measurements of expansion are, for the never dried samples, based on the datum dimension at the end of curing and for the dried samples the expansion is based on the datum length at the end of drying. The expansion of the dried samples therefore includes the taking up of shrinkage, and the two scales along the abscissa show expansion after curing-and-drying and nett expansion assuming 1000 microstrains of shrinkage.

The graphs show that the rate of shrinkage, measured as micro-strains per day, is decreased for any given curing or curing-and-drying by the addition to the composition of sodium carbonate alone or with pigment or with pigment and acrylic emulsion as indicated on the graphs. With the addition of sodium carbonate, pigment and acrylic emulsion, the rates of expansion are, compared with those not using any additions, as follows:

| Never dried specimens | | |
| --- | --- | --- |
| Curing. | Without added materials. | With sodium carbonate, pigment and acrylic emulsion. |
| 20° C. for 24 hours. | 17 micro strains/day at 200 days and absolute expansions growing large. | 2 micro strains/day at 500 days. |
| 60° C. for 5 hours. | 11 micro strains/day at 200 days and absolute expansions growing large. | 1.3 micro strains/day at 500 days. |
| 60° C. for 20 hours. | 7 micro strains/day at 300 days and absolute expansions growing large. | 0.4 micro strains/day at 500 days. |
| Specimens dried after curing | | |
| 20° C. for 24 hours. | Very large always. | 10 micro strains/day at 100 days and absolute expansions growing very large. |
| 60° C. for 5 hours. | Very large always | 1.3 micro strains/day at 500 days. |
| 60° C. for 20 hours. | 14 micro strains per day at 150 days and absolute expansions growing larger. | 0.4 micro strains/day at 500 days. |

In these tests a large absolute strain is 10,000 microstrains or above, and a very large rate of expansion is over 50 micro-strains per day.

By way of comparison, it may be noted that the expansion of a sample cast from a paste of neat sulphate-resisting Portland cement which is never dried and immersed in water is of the order of 500 micro-strains at 200 days and 1800 micro-strains at 200 days when the paste is cured, then dried and then immersed. The rate of expansion is about 0.5 to 1.8 micro-strains per day at 150 days and can sometimes still be as great as 3.0 to 4.0 micro-strains per day after a few years when immersed in water.

It can clearly be seen from these test results that the addition of sodium carbonate and the other materials improves the durability of the cast composition by decreasing its expansiveness through a range of curing regimes with and without drying. In practice, the environment of the cast composition in use in buildings, taken with normal hazards which might introduce water, such as roof leaks, windows surround leaks, burst pipes, leaking hot water radiators, or leaking pipes, will decide the selection of added materials required in any particular case.

I claim:

1. In a method of casting an article comprising the steps of mixing a composition comprising an hydraulic binding agent consisting essentially of, by weight, from 90% to 10% calcined gypsum, from 10% to 90% Portland cement and from 0% to 15% Pozzalana cement with water to produce a fluid mixture, causing said fluid mixture to flow into a supporting device, and allowing said mixture to set in said supporting device, the improvement wherein said composition further contains sodium carbonate in an amount of from about 0.1% to about 5% by weight of the dry weight of said cement in said composition, said sodium carbonate reducing local expansion or general expansion of said mixture with a consequent loss in compressive strength upon setting said mixture.

2. In a method of casting an article comprising the steps of:
   a. mixing water with a composition comprising a binding agent consisting essentially of, by weight, from 90% to 10% calcined gypsum and from 10 to 90% Portland cement, to produce a fluid mixture, at least one of said composition and said water being heated whereby said mixture has a temperature of from 70° to 130° F.;
   b. pouring said fluid mixture into a supporting device;
   c. allowing a reaction between said calcined gypsum and said water in said mixture to cause said mixture to set in said supporting device, said reaction producing heat which causes the temperature of said mixture to begin to rise;
   d. removing said mixture from said supporting device after said mixture has set sufficiently to be self supporting and thus form said cast article;
   e. controlling the dissipation of both heat and moisture from said set mixture forming said cast article whereby the temperature of said set mixture rises to from 90° to 180° F.;
   f. maintaining the temperature and moisture content of said set mixture for a period of at least two hours to cure said cement, the improvement comprising the additional step of;
   g. including sodium carbonate in an amount of from about 0.1% up to 5% by weight of the dry weight of said Portland cement in said composition, said sodium carbonate reducing local expansion or general expansion of said mixture with the consequent loss of compressive strength upon setting said mixture.

3. In a method of casting an article comprising the steps of mixing a composition comprising a binding agent consisting essentially of, by weight, from 90% to 10% calcined gypsum, from 10% to 90% Portland cement with water to produce a fluid mixture, causing said fluid mixture to flow into a supporting device, and allowing said mixture to set in said supporting device, wherein during the set of the mixture the mixture is contacted with water which causes a reaction between the calcined gypsum and the Portland cement to result in expansion of the mixture and a local or general expansion of the mixture with a loss in compressive strength thereof upon setting, the setting involving a period of time, wherein said expansion would occur without sodium carbonate, the improvement wherein said composition further contains sodium carbonate in an amount of about 0.1% up to about 5% by weight of the dry weight of said cement in said composition, said sodium carbonate reducing the local expansion or general expansion of said mixture whereby the consequent loss in compressive strength upon setting said mixture is reduced.

4. A method as claimed in claim 1, wherein said cement is sulphate-resisting Portland cement.

5. A method as claimed in claim 1, wherein said sodium carbonate content of said composition is between about 0.1% and 1.0% of the dry weight of said cement.

6. A method as claimed in claim 1, in which said sodium carbonate content of said composition is between about 0.1% and about 0.5% of the dry weight of said cement.

7. A method as claimed in claim 1, in which said mixture also contains an acrylic resin emulsion.

8. A method as claimed in claim 7, wherein said acrylic resin emulsion is present in an amount from about 0.25% to about 4% by weight of the dry weight of said gypsum and said cement in said composition.

9. A method as claimed in claim 7, wherein said acrylic resin emulsion is present in an amount of from about 0.5% to about 1.5% by weight of the dry weight of said gypsum and said cement in said composition.

10. A method as claimed in claim 1, in which said composition further contains a pigment selected from the group consisting of iron oxide, titanium oxide and cobalt oxide in an amount of from about 0.25% to about 4% by weight of the dry weight of said gypsum and said cement in said composition.

11. A method as claimed in claim 10, wherein said pigment is present in an amount of from about 0.5% to about 1.5% by weight of the dry weight of said gypsum and said cement in said composition.

12. A method as claimed in claim 1, wherein said binding agent contains, by weight, from about 50% to about 40% calcined gypsum and from about 50% to about 60% Portland cement.

* * * * *